Dec. 23, 1952     J. B. PARSONS     2,622,762
VALVED CLOSURE ASSEMBLY
Filed May 14, 1947

INVENTOR.
John B. Parsons
BY
ATTORNEY

Patented Dec. 23, 1952

2,622,762

UNITED STATES PATENT OFFICE 2,622,762

VALVED CLOSURE ASSEMBLY

John B. Parsons, Toledo, Ohio, assignor to Malcolm W. Fraser, Toledo, Ohio, trustee Application May 14, 1947, Serial No. 747,964

5 Claims. (Cl. 220—44)

1

This invention relates to valved closures for fluid systems and has for one of its objects the production of a simple closure member for normally barring communication between the atmosphere and the fluid system.

Another object of this invention is to produce a new and improved valved closure for normally sealing an opening in a fluid container yet enabling relief in the event that the positive or negative pressures within the container approach dangerous values.

A further object is to produce a closure member for the opening of a contained space subject to positive and negative pressures, the closure member including a valve member which normally bars communication between the outside atmosphere and the contained space but is responsive for relief in the event that the pressures within the contained space exceed predetermined values.

A still further object is to produce an improved valve which is characterized by simplicity, cheapness, carefree attention and reliability in barring communication between a fluid container and the atmosphere until excessive differential pressures exist between the container and atmosphere.

A still further object is to produce a new and improved cap assembly embodying the features described in a self contained portable unit which may be readily connected and disconnected from the filler spout of a fluid cooling system.

These and other objects of this invention will hereinafter appear and for purpose of illustration but not of limitation embodiments of this invention are shown in the accompanying drawings, in which Figure 1 is a fragmentary side elevational view of the front end portion and an internal combustion engine with an attached radiator assembly;

2

Figure 1:
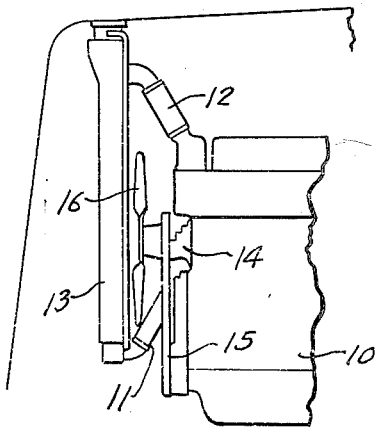
Figure 2:
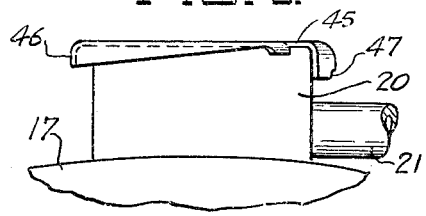
Figure 2 is a detail elevational view of the filler spout atop the radiator with the closure removed.

This invention will be described with respect to a closure member to be used in connection with a filler spout on a radiator and, for this purpose there is shown in Figure 1, a jacketed motor block 10 connected by means of hose 11 and 12 to the outlet and inlet respectively of a radiator 13. The radiator is of the type normally used for cooling the fluids circulating through a normally closed cooling system. Circulation of the fluid is effected by means of a pump 14 powered from the engine through an endless belt 15 which also drives the radiator fan 16.

The upper header of the radiator 13 has a top wall 17 which is provided with a circular embossed portion 18 having a central opening 19 extending therethrough. Fixed in nesting relation with the embossed portion, is a cylindrical filler spout 20 with an overflow pipe 21 leading therefrom, as a vent, an outturned flange 22 extending from the upper edge and an inturned flange 23 extending from the lower edge, which flanges operate as seats, as will hereinafter be explained.

24 is a radiator cap including a cup shaped portion formed of successive upper and lower cylindrical sections 26 and 27 of larger and small diameter respectively, connected by an annular flange 28. The bottom wall 29 of the lower section 27 is bowed upwardly. The upper cylindrical section 26 is adapted to correspond dimensionally with the filler spout 20 to aid in the proper insertion of the cup shaped portion in telescoping relation with the spout. Carried by the outer wall of the lower cylindrical section 27 is a sleeve 30 with openings 31 extending through the side walls thereof and with an outturned flange 32 on the upper end spaced a short distance below the flange 28 and another inturned flange on the lower end spaced a short distance below the wall 29. Loosely fitting within the annular groove 34 defined by the flanges 28 and 32, is a resilient sealing disc 35 of rubber-like material. When the cap is in the mounted position, the outer edge of the disc is in sealing engagement with the filler spout in the region beyond the overflow pipe thereby to bar communication between the radiator and the mouth of the spout. This prevents the dangers otherwise resulting from bursts of fluids, vapor and gases under pressure from the radiator.

As is well understood, a closed cooling system provides for many desirable features. However, the problem has been to obtain a closure valve which is free of complications and gives satisfactory performance and relief over a long period of time. For this purpose I have provided a new and improved valve 36 characterized by its simplicity and effectiveness in operation. This valve consists in its entirety of resilient or rubber-like material in the form of a cylindrical shell which tapers outwardly from the top to bottom and having an opening 37 extending longitudinally therethrough. The upper and lower sections 38 and 39 respectively of the shell are thin walled while the central wall section 40 is thicker and is annularly grooved about its outer wall, as at 41, to receive the flange 33 in gripping relation. In this position, the upper portion 38 of the shell seats against the underside of the wall 29 whereby the upper end is sealed. When the radiator cap is in the mounted position, the lower rim of the shell engages the seat 23 to effect a seal all around the opening to the radiator.

For purposes of mounting, the cap is formed with a downturned skirt 42 depending from the marginal area of an annular flange 43 integral with the upper edge of the cup shaped member. The skirt 42 is provided with inturned lugs 44 which may be passed through slots 45 in the flange 22 and into engagement with the bottom edge of the downturned wall 46 carried by the flange 22. This bottom edge is tapered to provide for a cam profile which increases from the opening 45 to a stop 47, and on rotation of the cap the lugs operatively engage the cammed edge to adjust the cap vertically into or out of the spout.

Figure 5:
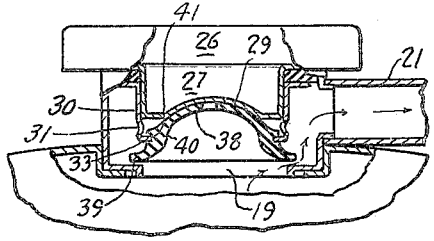
Figure 5 is a view similar to that of Figure 3 but showing the position of parts when excessive pressure exists within the radiator.

In the final seating position, the valve member 40 bars communication between the fluid system and the outside atmosphere through the filler spout or through the overflow pipe thereby to provide for closed fluid system which may be adapted to operate under slight positive pressure, it being understood that under such conditions the cooling system is more effective for then the temperature of the fluid may be maintained several degrees higher. However, in the event that excessive pressures build up within the fluid system, it is desirable that the valve member automatically establish communication with the atmosphere for relief. These pressures within the radiator might result from the expansion of fluid and vapors as their temperature increases during the operation of the engine and from other causes of inadvertent overheating. Whatever the reason, if the pressure is excessive there is ever present the danger of bursting the thin wall of the radiator core. To obviate this danger, the wall thickness of the shell may be calibrated or the resiliency of the material making up the lower portion 39 of the valve may be selected to yield in response to forces in excess of a predetermined value to unseat the rim, as illustrated in Figure 5 of the drawings. Thus communication is established between the radiator and the atmosphere through the overflow pipes to enable the desired relief.

Figure 4:
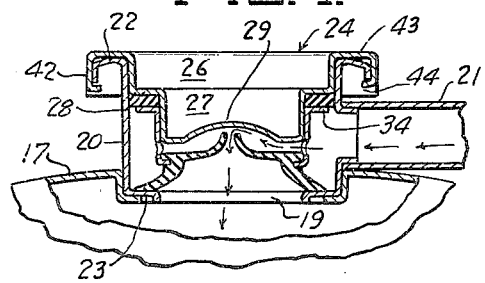
Figure 4 is a sectional elevational view similar to that of Figure 3 but showing the position of parts when excessive vacuum exists within the radiator.
Figure 3:
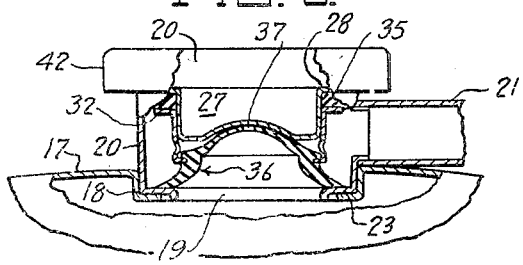
Figure 3 is a sectional elevational view through the filler spout with the closure member in place.

A dangerous situation may also arise when the cooling fluids contract and effect the build up of sub-atmospheric pressures within the fluid system which could cause the radiator to buckle if not relieved. For this purpose, the upper section 38 of the valve member is calculated to yield and unseat from the wall 29 of the cup-shaped member, as illustrated in Figure 4 of the drawings, in response to a pressure differential in excess of a predetermined value. Thus a direct channel is established from the radiator through the shell and openings 31 to the vent or overflow pipe 21.

From the above description it will be apparent that I have invented a closure member which normally provides for a closed fluid system which may operate under some slight pressure, but which automatically provides for relief in the event that a dangerous situation arises from excessive pressure or vacuum within the radiator. In the particular embodiment described, the cap is a unitary assembly which includes a sealing gasket interposed between the overflow and the mouth of the vent, which seal bars the flow therethrough of fluids under pressure until the cap is removed. Obviously, the removal of the cap may be delayed until the excess pressure has been dissipated through the valve and vent as previously described.

Figure 6:
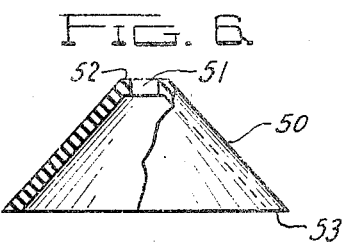
Figure 6 is an enlarged detail elevational view partially in section of another form of resilient valve member.

While invention is directed to a new and improved radiator cap assembly, it will be readily understood that the valve member itself may be considered an article of commerce. For example, if the cap member is in the form of a permanent fixture or if, in another manner, the wall 29 is fixed in spaced relation with the opening to a chamber subject to positive and negative pressure then the valve or a preferred modification thereof, illustrated in Figure 6, may be interposed between the opening of the fluid container and the underside of the wall 29. In this form, the valve member may be described as being frusto-conical shell 50 of rubber-like material with the opening 51 in the upper wall 52. When properly inserted, even without supports, the upper wall 52 seats against the underside of the wall 29 to bar the opening 51 while the lower rim 53 bears against the seat 23 and the valve bars communication between the chamber containing the fluid and the outside atmosphere.

Thus the rubber-like member forms an effective seal as long as the end walls are seated. However, in the event that excessive pressures or vacuums are generated within the container, the wall thicknesses of the shell may be calibrated or the materials selected to yield the relief of pressures in excess of a predetermined value. By reason of its elasticity, the lower rim 53 yields under the influence of internal pressures to establish communication with the outside atmosphere for relief, and to avoid interior sub-atmospheric pressure beyond a calculated value, the upper portion yields sufficiently to unseat from the wall 29 and establish communication with the outside atmospheres through the opening 51.

It is to be understood that numerous changes may be made in the details of the construction, assembly and operation of parts without departing from the spirit of the invention, especially as defined in the appended claims.

I claim:

1. In an engine cooling system having a contained space subject to positive and negative pressures, closure means including a wall in spaced relation with an opening through said contained space providing spaced seats therebetween, valve means arranged between said seats including an outwardly flared portion of resilient rubber-like material enclosing said opening and an apertured portion also of resilient rubber-like material bearing against said wall to close the aperture in such portion to seal the continued space from the atmosphere until said outwardly flared portion yields or the apertured portion yields in the event that positive or negative pressures respectively in the contained space exceeds predetermined values, the resiliency of the rubber-like material constituting the sole force for retaining the said portions of the valve means in sealing contact.

2. In an engine cooling system having a contained space subject to positive and negative pressures, closure means including a wall in spaced relation with an opening through said contained space providing spaced seats therebetween, a valve member in the form of a one piece frusto conical shell of rubber-like material apertured at the apex and arranged between said seats with the base of greatest dimension enclosing said opening and the apex of smaller dimension bearing against said wall to seal the contained space from the atmosphere until the valve member yields to unseat at the base or apex for relief in the event that the positive or negative pressures respectively in the contained space exceeds predetermined values.

3. A removable cap for a vented spout of an engine cooling system comprising a cup shaped member capable of insertion within said spout, means for mounting said cup shaped member in the inserted position, a sealing disc carried by said cup shaped member for sealing the system from the atmosphere at a point beyond the vent, a unitary valve comprising a semi-spherical shell of resilient rubber-like material having a base portion which seats all around the base of the spout in sealing relation and an apertured apex portion which seats against the underside of the cup shaped member in sealing relation until it yields in the base or apex for relief in the event that the positive or negative pressures in the cooling system exceeds predetermined values, and means carried by said cup shaped member for supporting said valve, and holding the latter against movement except for yielding the base and apex.

4. A cap assembly as claimed in claim 3 in which the means carried by said cup is a cylindrical shell having apertures through the side walls and an inturned flange at the lower end in spaced relation with the base of said cup shaped member and by which the valve is supported.

5. A cap assembly as claimed in claim 3 in which the valve is a frusto-conical shell of resilient rubber-like material having a frusto-conical opening extending longitudinally therethrough and with the walls thereof calculated to yield in response to predetermined differential pressures between faces.

JOHN B. PARSONS.

REFERENCES CITED

The following references are of record in the file of this patent:

UNITED STATES PATENTS

| Number | Name | Date |
| --- | --- | --- |
| 977,372 | Crane | Nov. 29, 1910 |
| 1,885,121 | Loweke | Nov. 1, 1932 |
| 2,133,575 | Rosenberg | Oct. 18, 1938 |
| 2,135,551 | Markwood | Nov. 8, 1938 |
| 2,214,364 | Edwards | Sept. 10, 1940 |
| 2,266,314 | Eshbaugh | Dec. 16, 1941 |